United States Patent [19]

Farnam et al.

[11] 3,837,657
[45] Sept. 24, 1974

[54] BEADED GASKET AND METHOD OF USING SAME

[75] Inventors: Robert G. Farnam, New Lisbon; Michael T. Passarella, Wis. Rapids, both of Wis.

[73] Assignee: F. D. Farnam Co., New Lisbon, Wis.

[22] Filed: Aug. 7, 1972

[21] Appl. No.: 278,259

Related U.S. Application Data

[63] Continuation-in-part of Ser. Nos. 211,003, Dec. 22, 1971, and Ser. No. , , which is a continuation-in-part of Ser. No. 76,459, Sept. 29, 1970, Pat. No. 3,655,210, and Ser. No. , , which is a continuation-in-part of Ser. No. 66,958, Aug. 26, 1970, abandoned.

[52] U.S. Cl.................... 277/1, 277/211, 277/234
[51] Int. Cl............................................ F16j 15/06
[58] Field of Search.................... 277/227–235, 277/207, 1, 211

[56] References Cited
UNITED STATES PATENTS

| | | | |
|---|---|---|---|
| 2,249,127 | 7/1941 | Goetze | 277/234 |
| 2,729,483 | 1/1956 | Victor | 277/234 |
| 2,753,199 | 7/1956 | Victor | 277/235 B |

FOREIGN PATENTS OR APPLICATIONS

| | | | |
|---|---|---|---|
| 801,127 | 5/1936 | France | 277/235 B |

*Primary Examiner*—Harry N. Haroian
*Assistant Examiner*—Robert I. Smith
*Attorney, Agent, or Firm*—Mann, Brown, McWilliams & Bradway

[57] ABSTRACT

A gasket structure and the method of making the gasket structure, as well as the method of utilizing the gasket for effectively sealing incongruous mating surfaces, which is characterized by providing the gasket with an upstanding bead on one or both sides, the density of which is always less than that of the unbeaded portion to provide maximum compressibility with maximum sealing conformability. The gasket is further characterized by having the unbeaded portion having a density that is, or can be, tailored to provide a pre-pressed body portion that is more stable to uneven clamping pressures, thus minimizing distortion while having increased torque retention. Where greater heat insulating qualities may be required the gasket structure may be made from asbestos fiber millboard having a minimum amount of binder and with either type of gasket where additional sealing properties are desired the gasket structure may be provided with a coating layer that is cured to effect maximum sealing and protect the gasket from deleterious effects of the environment in which it is used.

19 Claims, 25 Drawing Figures

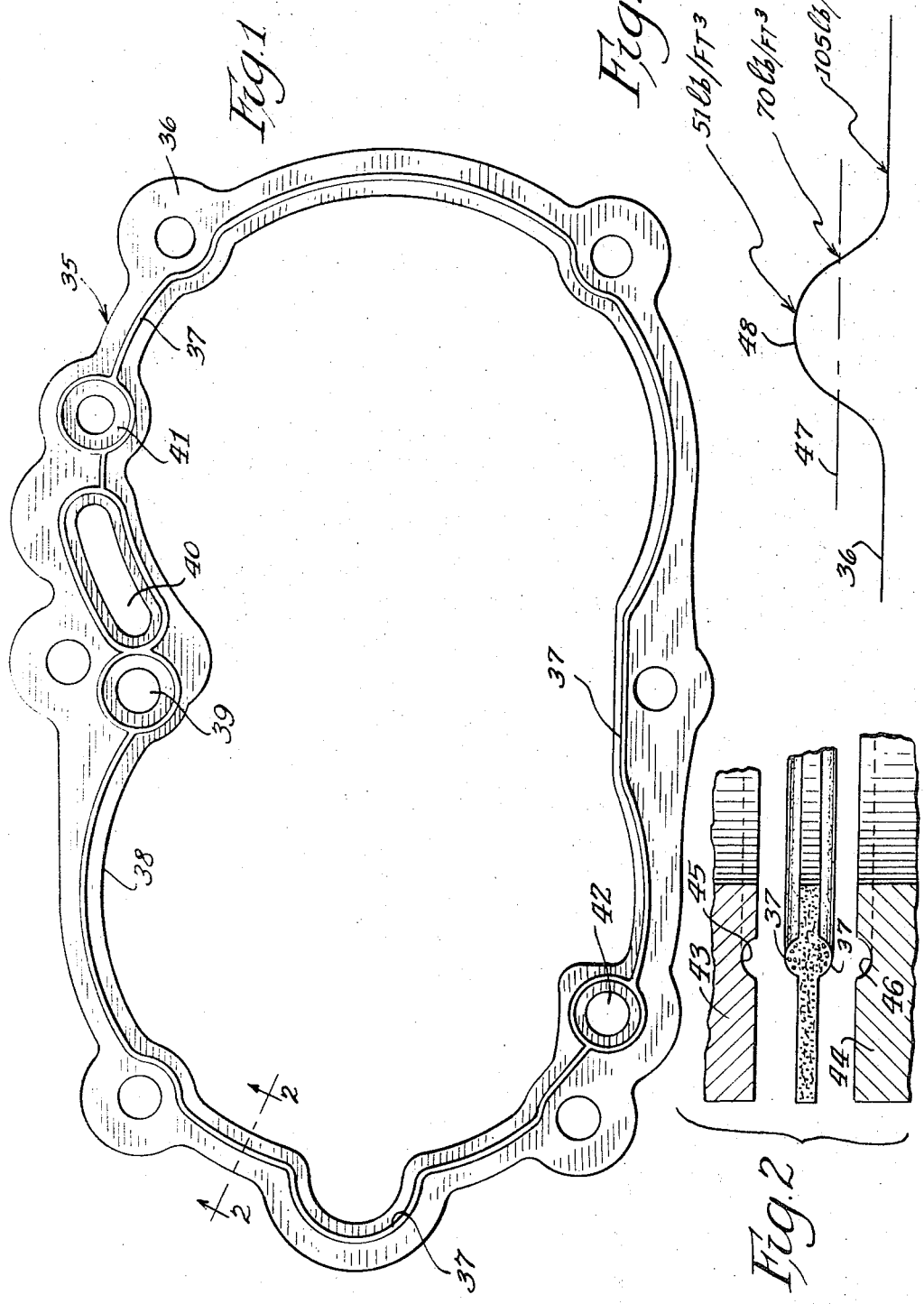

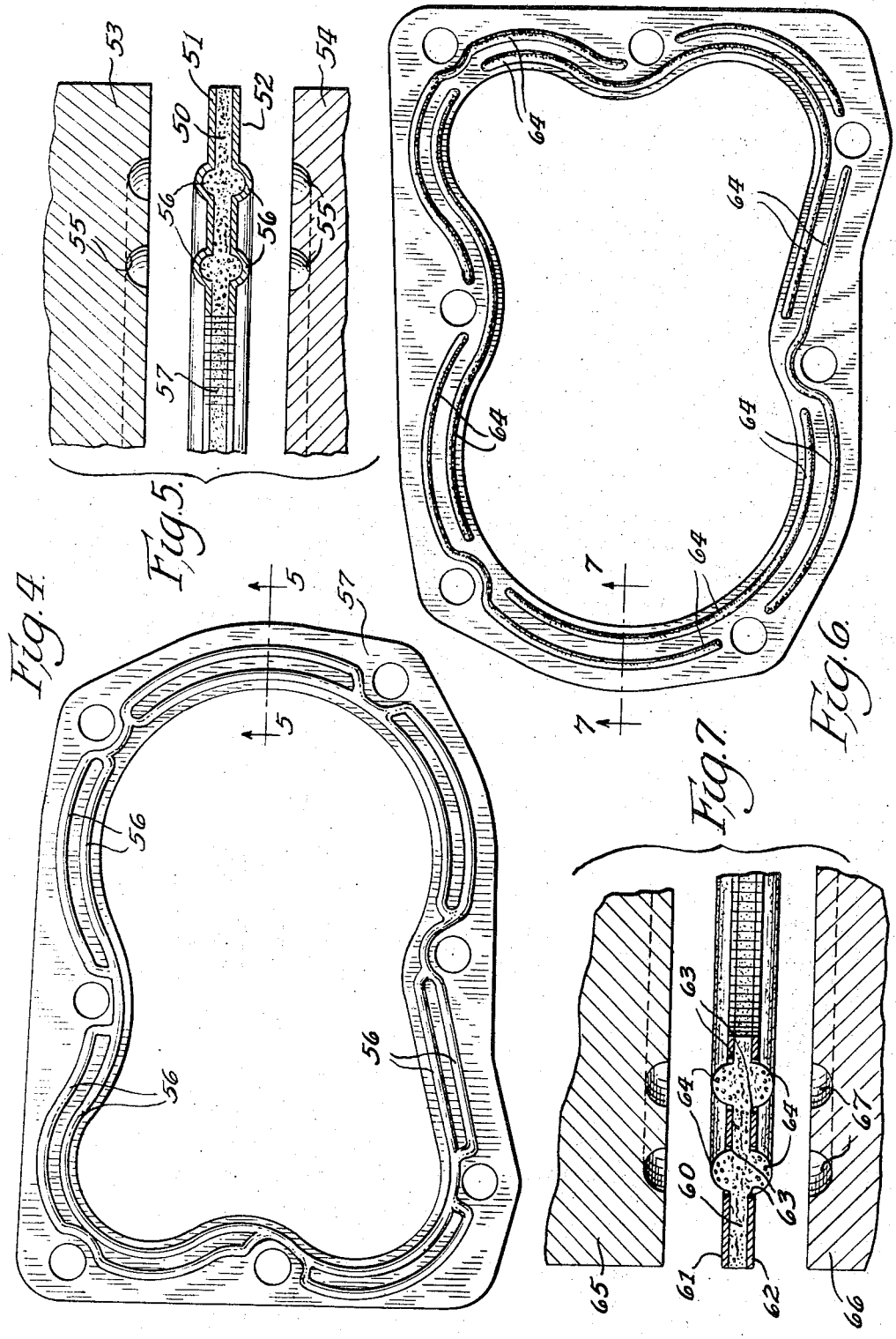

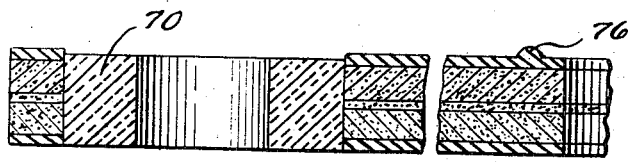
Fig.8.
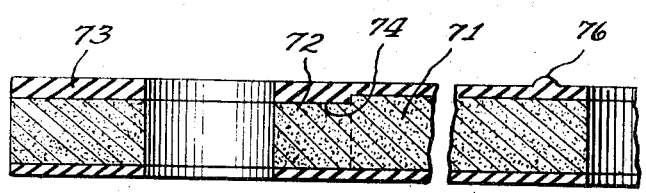
Fig.9.
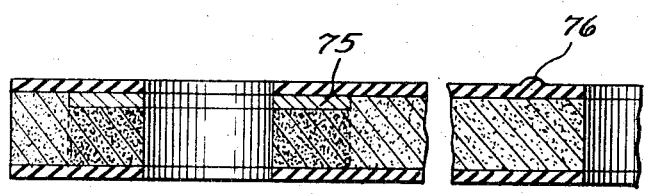
Fig.10.
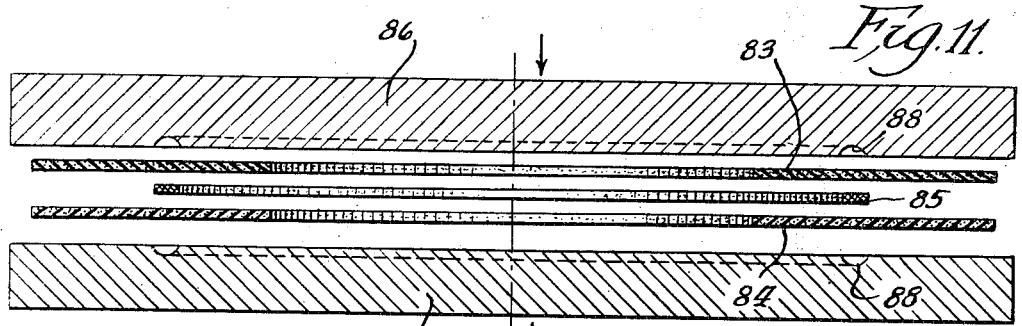
Fig.11.
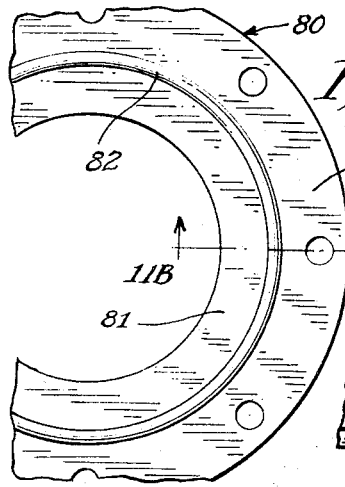
Fig.12.
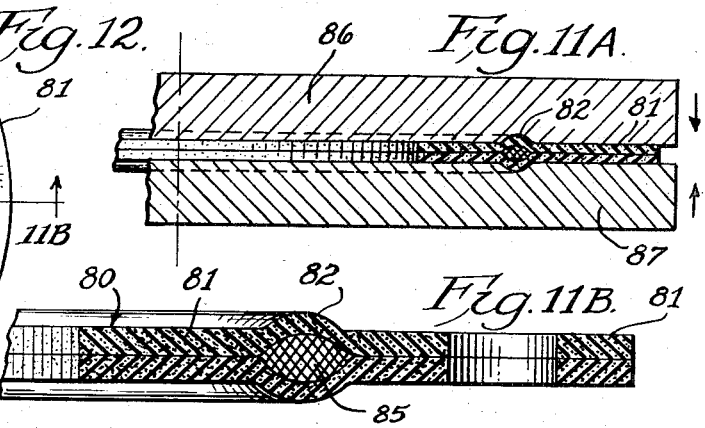
Fig.11A.
Fig.11B.

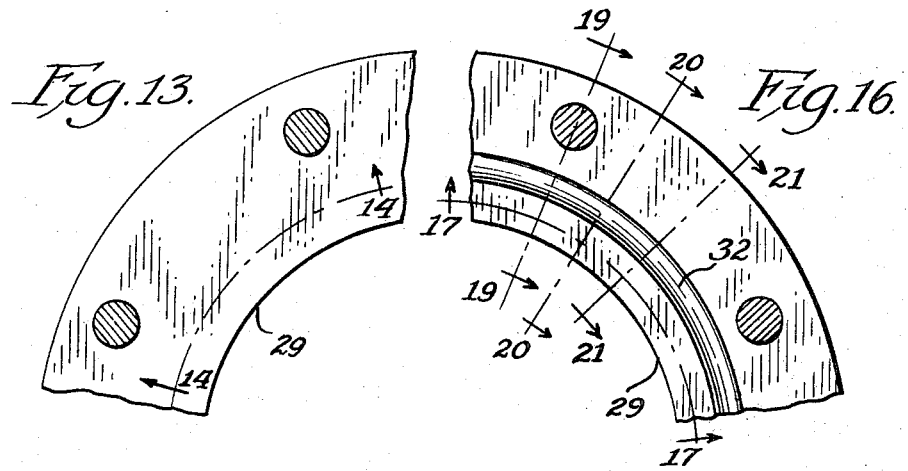
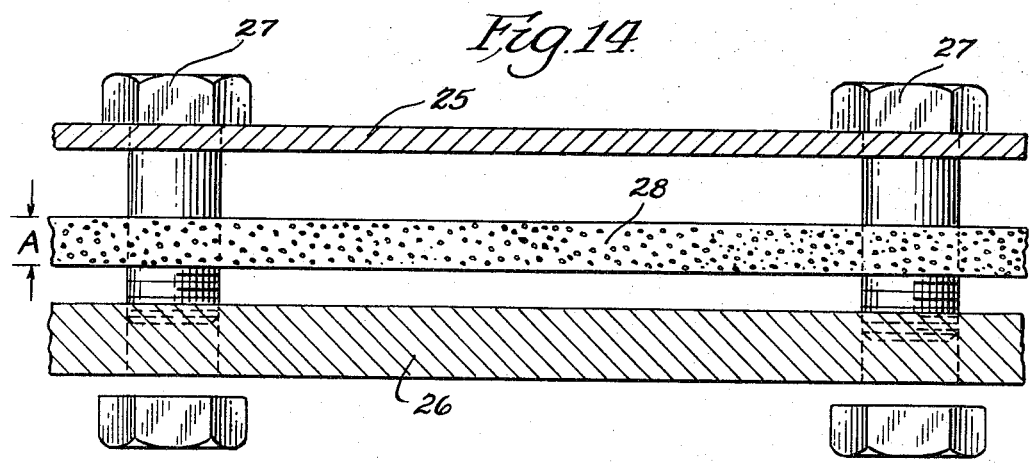

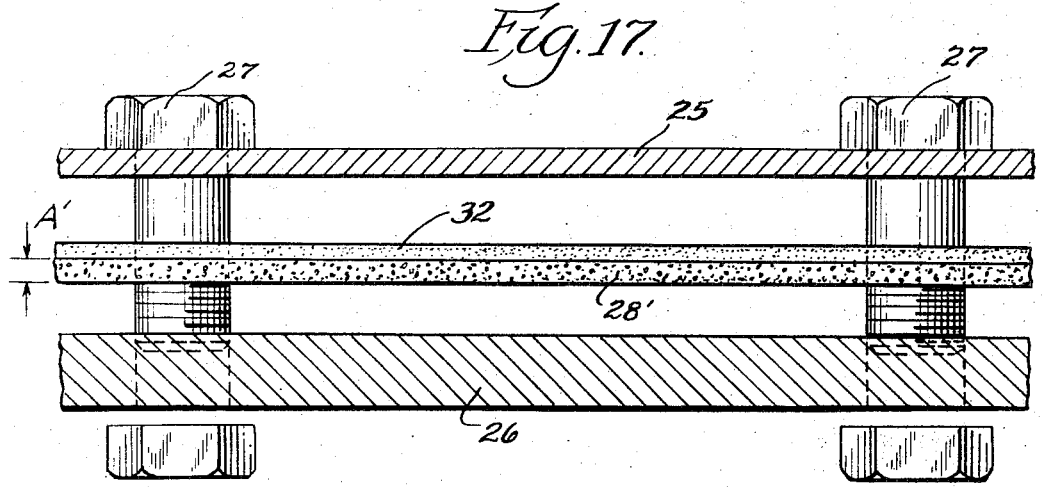
Fig.17.
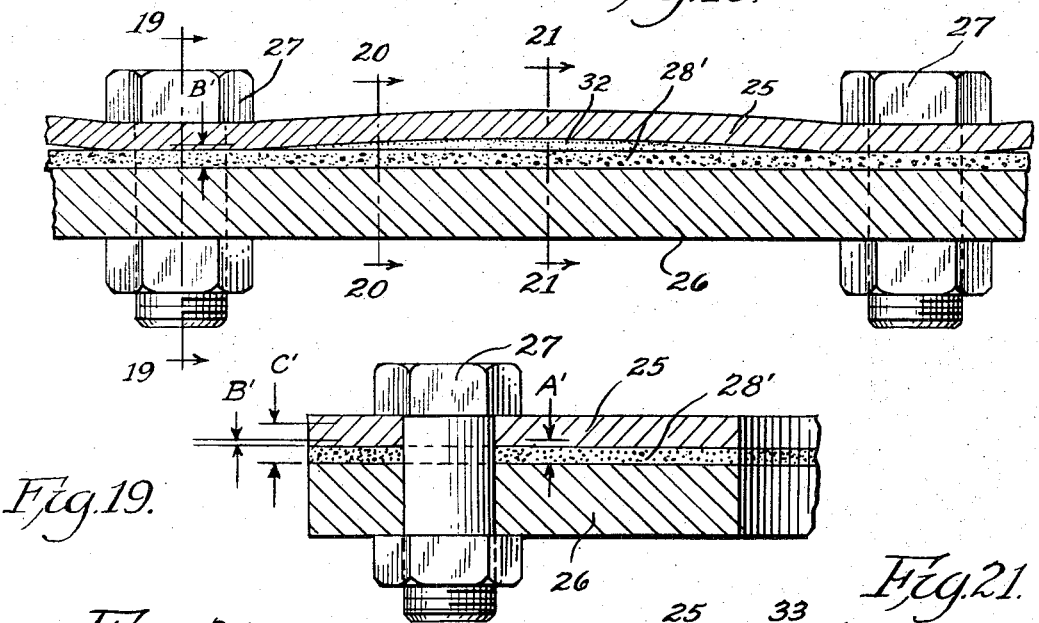
Fig.18.
Fig.19.
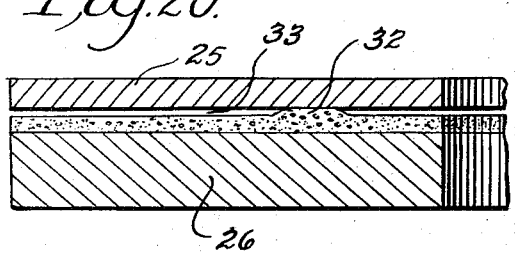
Fig.20.
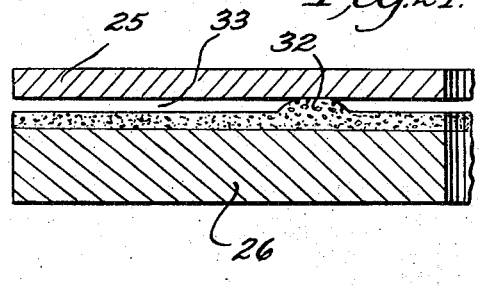
Fig.21.

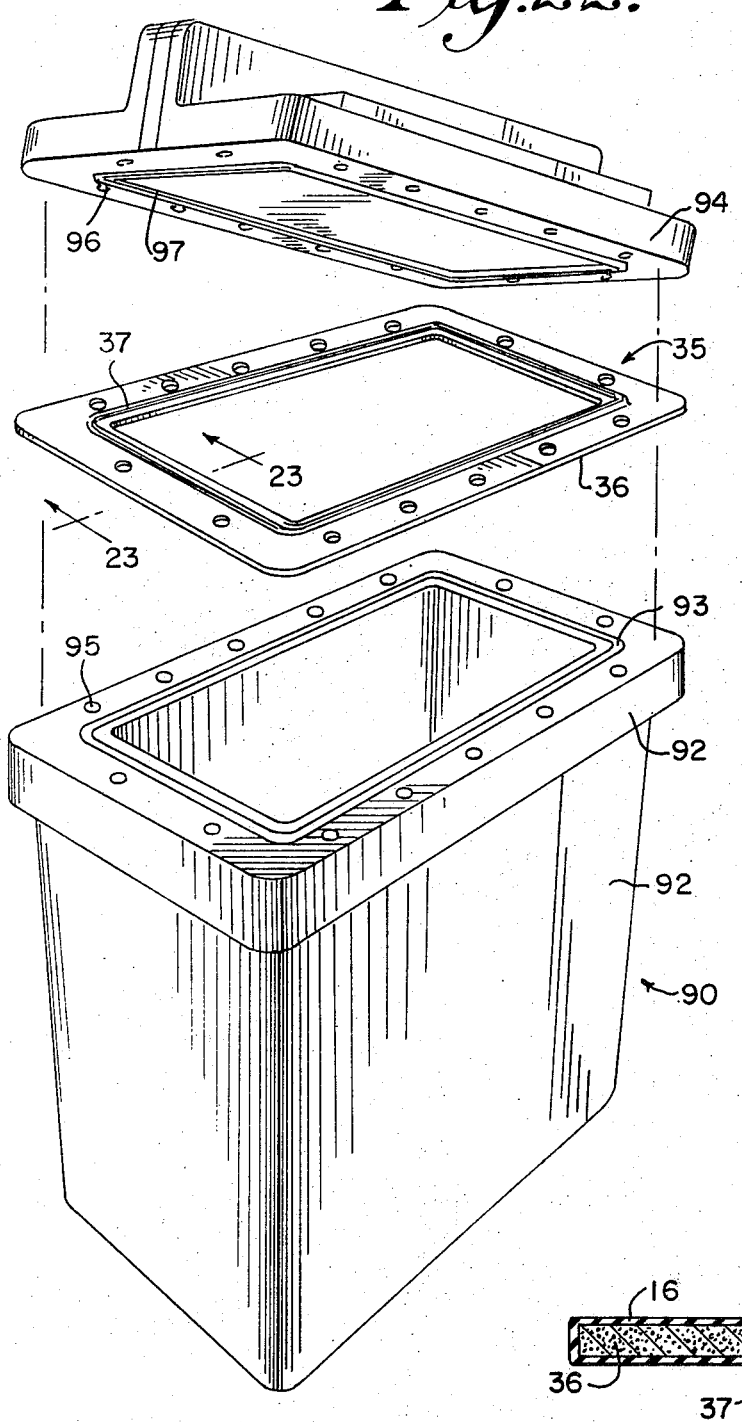

BEADED GASKET AND METHOD OF USING SAME

This application is a continuation-in-part of our application, Ser. No. 211,003, filed Dec. 22, 1971, which in turn is a continuation-in-part of our earlier application, Ser. No. 76,459, filed Sept. 29, 1970, now U.S. Pat. No. 3,655,210 which in turn is a continuation-in-part of our earlier application, Ser. No. 66,958, filed Aug. 26, 1970, now abandoned.

BACKGROUND OF INVENTION

The art is replete with gaskets that are provided with sealing beads of one kind or another, but conventionally these beads are of the same density and compressibility as the unbeaded portion. All of them, however, are quite limited in use because of functional properties, or cost.

Joints requiring substantially flat gaskets number in the thousands, with the environmental requirements being almost as numerous as the number of shapes and designs of the gaskets.

A limited number of jointing requirements are adequately answered by supplying a gasket with a molded upstanding bead or beads on one or both sides of the gasket so as to create a more conformable seal by virtue of the higher unit loading than could be created with the same material unbeaded; these gasket types are customarily made from solid elastomeric materials. The limiting factors in this type structure are cost, relatively poor torque retention, substantially uncontrolled distortion of the mating surfaces, and very limited physical properties because of the limited materials that can be formed into this type structure. Beads are and have been employed with considerable success in the manufacture of exhaust manifold and head gaskets on cars and trucks. These bead types are created by embossing gaskets, which are customarily varnish-like coated steel, steel which has been perforated or tanged and lined on one or both sides with such materials as asbestos paper, asbestos millboard (treated or untreated), or asbestos elastomeric sheet packings.

The beads created by embossing in the above-described structures depend on the spring-like effect developed by the embossing of the varnish-like coated steel and/or the steel insert in the gaskets that are lined with the materials mentioned.

These construction types, although quite successful in the above-named applications, are very definitely limited in their usage for reasons of economics, gasket flange designs that are suitable for the idea or acceptable to this method of sealing, or gasket material requirements — or combinations of these factors.

There exists today a pressing need for a gasket structure that can be economically tailored to fit literally thousands of applications that are subject to considerable distortion under clamp road and require high torque retention directly under and between the clamping bolts, for the gasketing of clamped faces is always an economic compromise that must be answered by providing a joint that can be sealed and many times opened and resealed, at the lowest total cost which includes the shape and structure of the clamping faces, number, size and type of fasteners, quality of flange smoothness and flatness, and many other factors.

SUMMARY OF THE INVENTION

This invention pertains solely to gasket materials and gasket structures which are compactible, and conform when compressed, as distinguished from steel, rubber and other solid materials which may flow to some extent under compression, but which do not compress. In other words, the materials and gasket structures with which this invention is concerned are characterized by having small voids therein whereby the density of the material may be increased selectively under appropriate pressure conditions, i.e., be compacted.

In this invention, the entire body portion of the gasket structure is precompressed, or compacted, while at the same time forming an integral bead on one or both sides of the gasket structure, with the bead being of less density than the remainder of the gasket structure after compaction, and preferably less density than that of the gasket structure prior to compaction. A gasket formed in this manner, and having these characteristics, is not only economical to fabricate, but also has the ability to effectively seal flanges which are otherwise subject to distortion or are uneven, causing variable clamping loads over the face of the gasket, and the lower density bead assures good sealing of the port or aperture that is to be sealed, while still permitting high torque retention of the clamping bolts and minimal distortion of the mating flanges.

BRIEF DESCRIPTION OF THE DRAWINGS

IN THE DRAWINGS:

FIG. 1 is a plan view showing a preferred embodiment of the invention in which the gasket is formed from a single sheet of suitable packing material;

FIG. 2 is a diagrammatic section through lines 2 — 2 of FIG. 1 showing the manner in which the bead of lesser density is formed during the precompression of the gasket structure;

FIG. 3 is a diagrammatic view which illustrates, by way of example, how a given packing sheet is made more dense in the precompression step throughout the body portion of the packing while the bead is made less dense during the same step;

FIG. 4 shows a modified form of the invention in which a packing sheet of suitable compressible packing material, in this instance asbestos millboard, is metal-clad on both sides and precompressed to form soft sealing beads;

FIG. 5 is a view corresponding to FIG. 2 showing the manner in which the beads are formed in the precompression step;

FIG. 6 shows another embodiment of the invention in which the core of packing material is metal-clad on both sides, but in which slots are formed in the metal facings to thereby permit the core material to be extruded through the slots during the precompression step;

FIG. 7 is another composite or exploded section showing the beads and the method of formation;

FIGS. 8, 9 and 10 are views taken from our copending applications, above identified;

FIG. 11 is an exploded sectional view illustrating another way in which a soft bead may be formed in a gasket structure, in this case a laminated gasket;

FIG. 11A shows the gasket structure after it has been formed in suitable dies;

FIG. 11B is an enlarged view of the beaded portion of the gasket;

FIG. 12 is a fragmentary plan view showing a simple application for a gasket structure of this type;

FIGS. 13, 14 and 15 are more or less diagrammatic views that will be used in explaining how an ordinary compressible gasket can cause distortion between clamping bolts and also result in leakage;

FIGS. 16 through 21 inclusive are also diagrammatic views that will be used in explaining how the gasket of this invention overcomes this problem, with FIGS. 19, 20 and 21 being taken on section lines 19 — 19, 20 — 20, and 21 — 21, respectively, of FIG. 16 and FIG. 18;

FIG. 22 is an exploded view of an automotive coil assembly utilizing a gasket structure in accordance with this invention; and FIG. 23 is a fragmentary cross sectional view to larger scale through the gasket structure of FIG. 22 showing the densified gasket structure with beads of relatively lesser density on both sides and having an applied coating on one or more surfaces of the gasket structure.

SPECIFIC DESCRIPTION

Basic Theory Underlying Invention

It will be helpful to an understanding of this invention to, first of all, consider the basic concept that is involved and the engineering principles which render the concept both sound and practical. For this purpose, reference is made to FIGS. 13 through 21 inclusive, and of these diagrammatic and schematic views, FIGS. 13 through 15 will be used in describing the problems that exist when using conventional unbeaded packing material for a simple ring gasket, and FIGS. 16 through 21 inclusive will be used in explaining wherein the present invention provides a far better gasket structure when used in a similar environment.

The fragmentary views of FIGS. 13 through 15 inclusive are intended to represent mating flanges 25 and 26 of two parts that are to be clamped together by bolts 27 with a gasket 28 interposed therebetween. The gasket is intended to seal an opening 29 from the external environment.

Whether one considers the gasket 28 as made of solid rubber, or made of fiber-reinforced elastomeric material which is more usual, and is the material depicted in FIGS. 14 and 15 for this particular explanation of the invention, the fact is that when the bolts are tightened to clamp the gasket in place, as shown in FIG. 15, it is obvious that substantial forces are developed between the spaced bolts 27 which tend to cause the flanges 25 and/or 26 to bow outwardly, particularly if made of light gauge or readily deformable materials. Pure rubber, of course, is not compressible since it is a solid, but fiber-reinforced elastomeric materials do have minute voids therein which enable the packing material to be substantially compressed and reduced in thickness, as illustrated at 30, with the result that bowing takes place in the flange 25 (assuming it to be more readily deformed than the flange 26) and it is possible, and often happens, that leakage takes place in the area, such as indicated at 31.

It should be understood that with relatively soft compactible packing material used in fabricating the gasket 28, as probably is necessary in order to obtain conformability, and hence sealability of the gasket, the bolts 27 are necessarily required to be drawn down substantially in order that the requirements with regard to torque retention are met. Obviously, the greater the extent to which the bolts are drawn down to provide the required torque retention during use, and to allow for stress relaxaction of the gasket material itself, the greater is the extent to which a large area of the flange 25 is subjected to lateral bending forces causing the flange to curve upwardly, as indicated in FIG. 15.

In contradistinction, it is contemplated in the present invention that the same compactible packing material may be used for the gasket, but in this instance the gasket 28, shown in FIG. 14, has been precompressed to provide a uniform body thickness A' (FIG. 17) as compared to the gasket thickness A in FIG. 14, and, during the precompression of the gasket 28', a relatively soft and highly compressible bead 32 has been formed which surrounds the opening 29. The amount of precompression, the amount of densification, etc., will be described later, but it will be seen that when the gasket 28' is substituted for the gasket 28 in the same ring gasket application, the bolt 27 may be drawn up tightly to provide a compression of the gasket 28' by an amount B', as distinguished from the compression of the gasket 28, as indicated at B in FIG. 15.

Assuming that C' (FIG. 19) represents the free height of the gasket 28' prior to precompression, A' represents the height of the body portion of the gasket 28' after compaction and prior to being clamped between the flanges 25 and 26, and B' represents the extent of compression during the clamping action. It will be seen that the soft bead 32 around the opening 29 will provide conformability for the mating flanges, to the extent that there is any unevenness, and that the force that tends to deflect or distort the flanges between bolts is greatly reduced because, in essence, it is being transmitted to the flanges through the relatively small cross-sectional area of the bead 32 which deforms readily due to its low density, thereby also holding to a minimum the distortion forces. Of course, in the compression of the body portion of the gasket 28', to the extent indicated by B', there is some transmittal of force to the flanges through the body portion of the gasket, but this is minimal, as distinguished from the condition which exists in the gasket application of FIGS. 13 through 15 inclusive.

It should be understood that FIGS. 13 through 21 inclusive are intended to be purely diagrammatic, and that although an air space is shown at 33 in FIGS. 20 and 21, in actual practice this space would be infinitesimal, if existing at all, in most applications, but, even if it should exist because of highly distortable flange portion, the bead 32 can and will provide the sealing that is required. Actually, in the practice of this invention, there should be substantially no distortion of the flanges.

In summary, the present invention provides a gasket structure in which the entire body portion of the gasket (i.e., the entire gasket, except for the beaded area) is of compressible and compactible material, but having relatively high density such that the gasket as a whole is characterized by excellent torque retention capabilities, with the sealing bead being of substantially less density and an integral part of the gasket structure to provide the necessary conformability and sealability for the particular application, and it is obvious that the gasket structure as a whole can be tailored to suit the particular application for which the gasket is to be used. The purpose of the precompressing or densifying step with the formation of the softer beaded are may be said to be:

1. To increase the density of the entire gasket, except for the beaded area, thus increasing the torque retention of the gasket and reducing distortion of the assembly;

2. To reduce the clamping pressure requirements of the unbeaded area in the gasket;

3. To increase the strength of the unbeaded area of the gasket so that it can function more adequately as a strong retainer or base for the bead;

4. To increase the fluid resistance of the unbeaded area in the gasket;

5. To increase the sealability and recovery characteristics of the gasket in the unbeaded area; and 6. To increase the tensile strength of the gasket as a whole.

EMBODIMENT OF INVENTION SHOWN IN FIGS. 1 – 3 INCLUSIVE

In the embodiment of the invention shown in FIGS. 1 – 3 inclusive, a beaded gasket is shown made in accordance with this invention in which the gasket, generally designated 35, has a body portion 36 which constitutes the entire gasket, except for the bead 37, which not only surrounds the central opening 38, but also auxiliary ports 39, 40, 41 and 42.

In general, the materials contemplated for this particular gasket are fiber-reenforced elastomeric sheet packing which are commonly used in the gasket art and which have proven themselves in service to be able to withstand the rigors of service conditions.

Typical of such packing materials are those sold by F. D. Farnam Co. of Lyons, Illinois under the trademarks "Kaopak" and "Kaobestos" and the fiber-reenforced cork product sold by the same company under the trademark "Kaokork." All of these products derive their compressibility and conformability by:

a. the closing of microscopic voids in the packing material;

b. the bending and/or distortion of the fibers, with the vegetable fibers being generally more deformable than asbestos fibers; and c. the deformation of the elastomer.

These materials when used in gaskets compress and conform with very little or no distortion, as distinguished from solid rubber which conforms to mating clamping surfaces by distortion, since solid rubber is, in essence, noncompressible.

In the specific gasket shown in FIGS. 1 and 2, the packing material from which the gasket is made may be described as a "Kaobestos" product which is made of nitrile rubber, asbestos and cellulose fibers with an organic filler. Preferably, the packing material is made in accordance with Kao U.S. Pat. No. 2,676,099, granted Apr. 20, 1954, and is identified by trade name Kaobestos 63100 ASTM P1241A. The sheet has a normal density of 75 lb/ft$^3$, but this is sometimes expressed, for convenience, as a density of 1.7 lbs/yd$^2$ considering a sheet 1/32 inch thick.

In fabricating the gasket shown in FIG. 1, the packing material is preferably die-cut to the desired shape and then placed between suitable ground steel blocks 43 and 44 having engraved therein, or otherwise formed therein, grooves 45 and 46. When the packing sheet is placed between the precompression blocks of the mold and the blocks are closed against stops, not shown, with suitable pressure, dwell time and temperature, the entire body portion 36 of the gasket is densified, with the exception of the bead 37, which is simultaneously formed within the grooves 45 and 46. The bead thus formed is always less in density than that of the compacted body portion for the practice of this invention, and the density which the bead 37 does acquire in the precompression step will depend upon the size and shape of the grooves 45 and 46, the amount of compaction that is made in the body portion of the gasket, and like factors. In all cases, however, the density of the bead after the body portion has been compacted is at least 10 percent less than that of the body portion; preferably it is equal to or less than the density of the packing material prior to compaction, and in some instances it is desirable for the density for the bead 37 after compaction to be less than that of the packing sheet prior to compaction.

This is illustrated in FIG. 3, in which line 47 represents the free height of the packing material prior to compression, and in this instance having a density of 70 lbs/ft$^3$, and after compression the bead has a height, diagrammatically indicated at 48, with a density of 51 lbs/ft$^3$, whereas the body portion indicated at 36, following compression, has a density of 105 lbs/ft$^3$.

In stating in the specification and claims that the body portion of the finished gasket has relatively high density and the bead portion has relatively low density, we mean that there is at least a 10 percent differential in density.

Other typical examples in which precompression has provided a denser body portion and a less dense bead are as follows:

Taking a Kaobestos 67367 packing sheet of .045 inch thickness with ASTM reference No. P1141A and comprising nitrile rubber, NBR and asbestos fibers, the original density of the sheet was 105 lbs/ft$^3$, and after precompression the bead density was 93 lbs/ft$^3$ and the body portion was increased to 135 lbs/ft$^3$.

Another example, taking Kaobestos 63100 1 of .125 inch thickness, the original density was 70 lbs/ft$^3$, and after precompression the bead density was 60 lbs/ft$^3$, and the body portion density was 98 lbs/ft$^3$.

All this indicates that the body portion density and the bead density may be tailored to suit the requirements of the particular application for which the gasket is designed.

Also, by way of more specific disclosures, and considering samples which will be called Samples 1, 2 and 3, the following technical data has been established by test:

BEADED SAMPLE

| | 1 | 2 | 3 |
|---|---|---|---|
| Media to Seal | Ethylene Glycol /H$_2$O | Petroleum Base Oil | Air |
| Envir. Temp. °F | 180°F/220°F | 160°F/180°F | 130°F Max. |
| Bolt Pattern | Poor | Fair | Poor |
| Internal Pressure | 30 psi | 5 psi Max. | 250 psi |
| Mating T.I.R. | .047 (Bending) | Est. at .005 (Bending) | .002 (Bending) |
| Flanges | Sht. Steel to Al. Cast | Al. to Steel | Brass to Al. |

BEADED SAMPLE—Continued

|  | 1 | 2 | 3 |
|---|---|---|---|
| Gasket Psi | 900 psi Est. | 3500 psi Est. | 2300 psi Est. |
| Vibration in Service | Yes | Yes | No |
| Farnam Kaobestos Product # | 63100 | 63100 | 67367 |
| Orig. Thickness | .125 | .045 | .045 |
| Final Thickness | .095 | .030 | .035 |
| Orig. Dens. lbs/ft$^3$ | 70 | 70 | 105 |
| Final Body Dens. lbs/ft$^3$ | 98 | 105 | 135 |
| Bead Hgt. Ea. Side | .025 | .016 | .008 |
| Th. Total | .145 | .062 | .051 |
| Anti-Stick Req'd | No | No | Yes |
| Stop Height (Mold) | .095 | .028 | .032 |
| Mold Temp. | 400° | 400° | 250° |
| Dwell Time | 1 Min. | 1 Min. | 30 Sec. |

With reference to the above particulars for samples 1, 2 and 3, the bolt pattern means the evenness or unevenness of the clamping load on the gasket and is described as either poor or fair; Mating T.I.R. means true indicator reading and indicates the approximate out-of-flat condition; Gasket Psi indicates the estimated clamping force on the gaskets, calculated from the number of bolts, torque applied and the type of bolts; Original Thickness means the thickness of the gasket before hot-pressing to form the bead and set the body thickness; Final Thickness indicates the thickness of the body portion of the gasket after hot-pressing; Thickness Total indicates the total height measured over the beads; and Stop Height (Mold) indicates the blocks or stops in the mold which, when closed, set the height of the part with slight allowances being made for bounce back.

Again, to illustrate the great advantages which are derived from the use of a gasket of the type herein described, there is set forth below a typical specification of requirements for a particular gasket application, and alongside these stated requirements are the physical characteristics of a beaded gasket made in accordance with this invention, and an unbeaded gasket made of the same material without precompression.

| REQUIREMENTS:<br>Original Properties | Specification Limits | Beaded Gasket | Unbeaded Gasket |
|---|---|---|---|
| Comp. at 5000 psi | 25 +/− 5 | 4.6% | 24.2% |
| Comp. at 1000 psi | 13 +/− 5 | 1.3% | 12.6% |
| Recovery | 40% min. | 76.7% | 51.1% |
| Tensile (Trans.) | 2000 psi min. | 3700 | 2375 |
| Hardness | 90 +/− 10 | 97 | 93 |
| Stress-Relaxation | .035″ − 34.0%<br>.045″ − 39.0% | 23.2% | 37.1% |
| Flexibility | 5× max. | 2× | 3× |
| ASTM # 1 Oil Aging—5 hrs. at 300°F | | | |
| Comp. at 5000 psi | 35% max. | 5.6% | 25.1% |
| Loss in Tensile | 25% max. | 18.7% | 22.1% |
| Weight Change | 40% max. | 1.3% | 23.7% |
| Thickness Change | 0 to 15% | 0.0% | 5.2% |
| Flexibility | No cracks | 4× | 4× |
| ASTM # 3 Oil Aging—5 hrs. at 300°F | | | |
| Comp. at 5000 psi | 35% max. | 5.8% | 31.5% |
| Loss in Tensile | 30% max. | 16.0% | 28.4% |
| Thickness Change | 0 to 20% | 5.8% | 12.1% |
| Weight Change | 45% max. | 6.0% | 30.7% |
| ASTM Ref. Fuel B—5 hrs. at 70° to 85°F | | | |
| Thickness Change | 0 to 15% | 7.4% | 14.1% |
| Weight Change | 35% max. | 16.0% | 29.8% |
| Density | 1.60 − 1.75 | 2.06 | 1.64 |

The superiority of the gasket of this invention is clearly shown by this comparison with an unbeaded gasket of the same material.

EMBODIMENT OF THE INVENTION SHOWN IN FIGS. 4 and 5

The embodiment of the invention shown in FIGS. 4 and 5 illustrates how the same principle may be applied to a metalclad gasket, providing the core structure is compactible because of being other than a solid material. In this case, the core 50 is an asbestos millboard (asbestos fibers held together by a small amount of high temperature inorganic binding material, such as the product marketed by GAF Corp. under the trade designation 210ES) of approximately .100 inch thickness, with tin-plated steel covers 51 and 52 of .006 inch on each side, and with the bead formed by compressing the body of the composite gasket in a suitable mold, as indicated at 53 and 54, having grooves 55 therein which permits the beads 56 of lesser density to be formed on opposite sides of the gasket. Again, it is characteristic of this form of the invention that the density of the bead 56, even though metal-clad, is less than the density of the body portion 57 of the gasket, and preferably the grooves 55, mold stops, pressures, etc. are chosen so that the density of the beads 56 is less than that of the gasket structure prior to the precompression step.

Obviously, instead of asbestos millboard being used for the core structure, other suitable materials may be used, provided they are compressible, and such other materials are contemplated including the wellknown fiber-reenforced elastomeric sheet packing. Asbestos millboard qualifies as a suitable material because it is essentially composed of asbestos fibers with very small amounts of binding, and it does have air spaces or voids which makes the material readily compactible.

The asbestos millboard may be utilized also in a heat insulating gasket where the cover stock is eliminated but in this case asbestos millboard is used which is made with short fibers, preferably oriented to be disposed parallel to the surface of the millboard and with a minimum content of phenolic resin. When this type of asbestos millboard is used for the gasket, the millboard is densified and the integral bead is formed so that the bead is a part of the millboard and is of a lesser density than the gasket itself. Thus, the advantages of the invention are realized in the production of a useful gasket structure manufactured from this material and which may be coated with a coating material that seals the voids that may remain in the gasket material after densification, particularly in the bead area, and provides an impermeable seal against vapor or liquid penetration into the gasket material as well as a surface seal over the entire area of the gasket when clamped between opposing surfaces.

For a description of a suitable coating applied to an appropriate gasket material and a method of manufacturing the article produced thereby, reference may be had to prior U.S. Pat. No. 3,661,401, of May 9, 1972, the disclosure of which is pertinent hereto and which is hereby incorporated herein by this reference.

THE EMBODIMENT OF FIGS. 6 and 7

In this embodiment of the invention, the core portion 60 of the gasket is also metal-clad, as indicated at 61 and 62, and preferably the core material 60 is a fiber-reenforced elastomeric material such as Kaopak, Kaocork and Kaobestos products heretofore referred to, and the metal facings 61 and 62 may be thin gauge, ductile steel, stainless steel, or tin-plated soft carbon steel.

In this case, the metal covers 61 and 62 are slotted, as indicated at 63, to define the beaded areas 64, but it will be observed that the beads 64 in this instance are not continuous but consist of inner and outer rows of such beads arranged in staggered or overlapping relation in order to effect proper sealing of the gasket. The beads are formed when the metal-clad core structure 60 is placed between suitable forming dies 65 and 66 provided with grooves 67 to confine and shape the core material as it is forced outwardly through the slots 63 during the precompression step.

FIGS. 8, 9 and 10

FIGS. 8, 9 and 10 depict a heat-insulating gasket that is disclosed more fully in our copending applications, Ser. Nos. 66,958 and 76,459, and in this form of gasket the primary object was to obtain adequate torque retention of the bolts through the use of highly densified low k material to impede heat transfer between the parts being clamped together. In FIG. 8, this is accomplished by the use of a hard and dense insulating bushing 70 comprising multiple layers of phenolic impregnated asbestos millboard, highly compressed and cured. In FIG. 9, the core material 71, which was a relatively thick vegetable fiberboard, was coined or densified in the area of the bolt holes, as shown at 72, and had a gasket cover sheet 73 thickened at 74 to fill the space left by the coining operation.

In FIG. 10, such space was filled by a metal or insulating washer 75, and in that case the gasket cover sheet 73 was of uniform thickness.

In each of these instances, the gasket cover sheet was preferably made of a fiber-reenforced elastomeric material, and a bead 76 was formed in the cover sheet and integral therewith having a density less than that of the remainder of the cover sheet.

It should be pointed out that, although the earlier disclosure of a gasket cover sheet for heat-insulating gaskets did provide for a bead of lower density than the remainder of the cover stock, the body portion of the gasket, taken as a whole and exclusive of the beaded area, was not of uniform high density, which is of essence to the present invention.

EMBODIMENT OF THE INVENTION SHOWN IN FIGS. 11, 11A, 11B and 12 INCLUSIVE

It is not always necessary to form the gasket bead by what might be called a pressure relief process wherein pressure on the body portion of the gasket causes expansion of the gasket in the bead area to form the bead of lower density. For example, in FIGS. 11, 11A, 11B and 12 a simple ring gasket 80 is shown having a body portion 81 and a beaded portion 82. In this instance, the gasket is a laminate formed of upper and lower halves 83 and 84 of a suitable compressible packing material, such as those previously described, with a bead insert or filler 85, formed of similar material or a less dense material and precut to the shape of the desired bead, being sandwiched between the upper and lower halves 83 and 84 of the laminate. When the parts are placed in proper position and alignment with dowel pins, or in a similar manner, between forming dies 86 and 87, each having a recess 88 defining the shape of the bead, the mold is closed with suitable pressure, dwell time, heat, etc. to form the composite gasket 80, and preferably also the packing sheets 83 and 84 are coated on their inside faces with a suitable adhesive so that after the precompression step the laminates are held firmly together. The types of adhesive used for a laminate of this type are well known and need not be specifically described.

As in the other cases, the gasket 80, after it has been pressed to its desired thickness, has substantially greater density than the integral bead 82. Preferably also, the bead 82, taken throughout its entire height, has less density that the individual packing sheets 83 and 84 used in making the gasket.

In the embodiment shown, the gasket material is a high density nitrile asbestos known as Kaobestos 67367 which is a nitrile rubber, NBR with asbestos fibers, and further defined as ASTM P1141A. The two halves are each 1/32 inch thick and interiorly coated with a synthetic elastomer-resin adhesive approximately .0005 inch thick and dried. The filler material 85 is a less dense material composed of nitrile rubber, vegetable fibers and cork which is highly compressible.

MODIFICATIONS

It is obvious that the invention may be variously embodied within the teachings of this invention, and the particular materials used are relatively unimportant as compared to their physical properties with respect to compressibility, compactibility, density, torque retention, sealability, resistance to specific fluids, as well as to the physical characteristics well known and constantly dealt with in the gasket art. The important thing is that substantially the entire body portion of the gasket structure (i.e. at least 70 percent of the total gasket) is intended to be of substantially uniform relatively high density but possessed of some compressibility, with the beaded area (i.e. not more than 30 percent of the gasket) being of lesser or relatively low density, and preferably of lesser density even than that of the gasket material prior to the forming operation that created the integral bead. It is this interrelationship which makes possible the effective sealing of imperfectly matched parts, or parts which are readily subject to distortion, in an efficient economical manner, while in the past such applications have created hundreds of costly failures.

Obviously, the pressures, temperatures, dwell time or the like, suitable for compacting gaskets in accordance with this invention and forming integral beads therewith, will vary according to the particular materials being used, but, in general, it may be said that with fiber-reenforced elastomeric materials, the temperature range for fabricating the gasket might be between 250° to 400°F, with a dwell time of 1/2 to 4 minutes, and approximately 1,000 to 10,000 pounds per square inch of pressure. In the case of asbestos millboard with inorganic high temperature binders, the temperature range may run somewhat higher, or, in some instances, pressure along may be sufficient.

Although for the most part fiber-reenforced elastomeric packing sheets and various types of asbestos millboard, vegetable fiberboard, and like fibrous materials are to be preferred because of their well-known suitability in the gasket art, this invention is not limited to any particular materials for the gasket structure, the only requirement being that it be compactible under pressure without substantial distortion, so that when pressure is relieved the body portion of the gasket has acquired a precompression, giving it a density that is suitable for the particular gasket application for which it is intended, with an integral bead being a part of the gasket structure having a least 10 percent less density than that of the precompressed body portion. It has been found that certain cork-reenforced elastomeric materials will provide a similar type of compactibility to the fiber-reenforced elastomeric material, and such materials are also usable in the practice of this invention.

EMBODIMENT OF FIGS. 22 and 23

In this embodiment of the invention a gasket structure is shown for use with an automotive ignition coil. The coil 90 as shown, comprises a housing 91 made of molded plastic and having a sealing flange 92 extending continuously around its upper edge. A groove 93 is provided in the top surface of the flange 92 into which the bead 37 of the gasket 35 is adapted to be compressed when the molded plastic cover 94 of the coil is secured in place by suitable means such as by bolts extending through the holes 95 and 96 in the tip flange 92 and cover 94, respectively. The cover 94 completes the coil assembly 90 and a male bead 97, integral with and depending from the underside of the cover, is disposed contiguous with and overlying the gasket bead 37 so that when the coil cover 94 is tightened down on the top flange 92 of the coil housing 91, with the gasket 35 therebetween, the bead 97 develops pressure on the bead 37, which is thus forced more tightly into the groove 93 so that the joint between the coil housing and cover is effectively sealed.

As best shown in FIG. 23, the gasket 35 is encapsulated with a coating 16 which is a blend of chloroprene rubber and phenolic resin. The coating, after application to the gasket, is cured and the gasket may then be coated with a release coating to avoid sticking. Encapsulation of the gasket 35 is particularly beneficial where compaction or compression of the gasket may not be sufficient to completely close the voids occurring in the compactible material from which the gasket 35 is made. The encapsulated gasket thus affords an effective seal between opposing surfaces under these conditions.

It should be understood that the material to be used for the gasket structure of this invention must be a compactible material, and this requires that it have microscopic voids within the material which permit the components of the material to be squeezed more tightly together under pressure. The reason why fiber-reenforced elastomeric materials possess this property, and the reason why asbestos and millboard or vegetable fiberboard, in general, possess this property is because in the formation of the product, it is impossible to have the fibers in complete parallel nesting relationship without some such voids. Cork-reenforced elastomers obviously have microscopic voids because cork is cellular by nature.

More specifically, the materials contemplated for making gaskets according to this invention fall for the most part under the following general types:

a. Fiber-reenforced elastomeric sheet packings, such as sold by F. D. Farnam Co. under the trade names of Kaopak, Kaokork and Kaobestos.

b. Fiberboards such as sold by Shufibre Division of Colonial Board Company under trade names of: S-201, S-601, SFB.

c. Treated and untreated asbestos paper and millboard such as sold by GAF Corporation (Rubberoid Division) under the trade names of: 21OES, 101, E-500, E-107; or by Nicolet Industries as No. 553 Nicoseal.

d. Cork and rubber sheet packings such as sold by Sheller-Globe Corp. (Mtchell Smith Division) under trade names of: NC50, NCA60, CR60, and HC80.

e. Combinations of these type materials such as fiberboard lined on one or two sides with fiber-reenforced elastomeric sheet packings. Steel, or other metal with any of the above-named type materials used on one or two sides as gasket, and which gaskets have been formed as above described before or during the combining operation of the steel or other metal.

f. Persons familiar with the art will recognize that each application will require the selection of the proper density, thickness, as well as curing properties to arrive at the required end product in the prepressed beaded form. Persons familiar with the art will also recognize that all materials under a given type are not necessarily suitable for practice of the invention in their standard form, for example suppliers of fiberboard make many types that are, under a given grade, of too high a density to prepress so as to form a suitable bead. For example, fiber-reenforced elastomeric materials, i.e., K-68, A-56 and 2706, as manufactured by Raybestos-Manhattan, Inc., are in their standard form generally unsuitable because of their exceptionally long fiber structure, relatively uneven formation and relatively high density.

As previously stated, the bead that is formed in the gasket according to this invention is always at least 10 percent less in density than the density of the body portion of the gasket and does not occupy more than 30 percent of the total area of the gasket. Within these parameters, the choice of bead height, thickness and density will be dictated by particular conditions.

A chart is given below which takes typical materials that are suitable for the practice of this invention, and for each such material there is given, first, normal range for bead width, bead height, body thickness and body density for that material, and then immediately thereafter what might be considered typical values for these specifications for such material.

SUMMARY

In summary, a gasket made in accordance with this invention has in general the following gasketing properties:

a. The upstanding bead is always of a lower density than the unbeaded portion with corresponding higher compressibility and enhanced conformability.

b. The beaded portion constitutes not more than 30 percent of the total clamping area of the mating flanges between which the gasket is to be placed.

c. The compressible unbeaded portion is always pre-pressed to a density which is always approximately

| MATERIAL | BEAD WIDTH RANGE (INCHES) | | BEAD HEIGHT RANGE (INCHES) | | BODY* THICKNESS RANGE (INCHES) | | BODY DENSITY RANGE (lb/ft$^3$) | |
|---|---|---|---|---|---|---|---|---|
|  | Min. | Max. | Min. | Max. | Min. | Max. | Min. | Max. |
| 1. KAOBESTOS | .015 | .125 | .003 | .050 | .005 | .125 | 30 | 140 |
| (Typical) | .025 | .090 | .005 | .030 | .015 | .100 | 85 | 120 |
| 2. ASB. PAPER TREATED do. |  |  |  |  |  |  |  |  |
| ASB. MILLBD. TREATED do. | .020 | .187 | .015 | .100 | .010 | .125 | 60 | 120 |
| (Typical) | .035 | .125 | .030 | .080 | .020 | .090 | 75 | 100 |
| 3. FIBERBDS. | .020 | .187 | .015 | .100 | .010 | .125 | 50 | 95 |
| (Typical) | .035 | .125 | .030 | .080 | .020 | .090 | 60 | 85 |
| 4. CORK and RUBBER | .025 | .200 | .020 | .125 | .020 | .187 | 30 | 85 |
| (Typical) | .040 | .150 | .030 | .090 | .030 | .125 | 45 | 65 |

* "Body" refers to unbeaded portion of the beaded gasket.

Insofar as bead densities are concerned, there are given below three typical examples of the relationship between bead density and body density.

equal to, and preferably greater than, the density that can be developed by the clamping faces between which it is to be installed, with the developed pressure mean-

```
A. Density Unbeaded Area              100 lb/ft³
   Thickness unbeaded area            .040"
   Bead height, each side             .010"
   Total thickness measured over beads (.040 + .020) .060"
   Average density of bead:
                                      (100 × .040"/.060") = 66.66 lb/ft³

B. Density Unbeaded Area              110 lb/ft³
   Thickness unbeaded area            .030"
   Bead height, each side             .012"
   Total thickness measured over beads .054"
   Average density of bead:
                                      (110 × .030"/.054") = 61.11 lb/ft³

C. Density Unbeaded Area              80 lb/ft³
   Thickness unbeaded area            .060"
   Bead height, each side             .015"
   Total thickness measured over beads .090"
   Average density of bead:
                                      (80 × .060"/.090") = 53.67 lb/ft³
```

The beads may, of course, take various shapes and forms and may be thin and substantially semi-circular in cross section, or they may be more or less flat-topped beads but occupy not more than 30 percent of the total area. The exact shape, size, material and density will depend upon the particular application, but in general we have found that a semi-circular bead, which has a radius approximately 25 percent of the thickness of the compacted body portion of the gasket, will suit many applications. This is only by way of illustration and not by way of limitation.

ing the clamping pressure obtained at the time of installation of the gasket.

d. The prepressed compressible unbeaded device provides a jointing for the clamp faces that is substantially distortion-free and with maximum torque retention properties that can be obtained in the particular material used for a particular gasket.

e. With the beaded portion made integral with the unbeaded portion, and with the beaded area being always substantially less than the net clamping area in the assembly, the force required to seal by virtue of the bead is always minimized to substantially eliminate distortion of the clamping faces between which the gasket is used.

A gasket having the above attributes provides a number of distinct advantages:

1. Clamping forces required to effectively seal mating surfaces are lowered due to the substantial lower density of the beaded portion, which is in turn substantially much less in area than the total clamped area. Conversely, gaskets of this type provide a simple means of increasing the unit loading without increasing the clamping force. Almost every gasket application for gasketing a joint is a compromise, but it is safe to say that the industry has been plagued with thousands of applications that require higher unit loading which cannot be accomplished in a practical way, since to accomplish the result at all would require major design changes, resulting in prohibitive total cost.

2. The relative simplicity of the manufacturing process provides substantially endless selectivity to tailor the gasket to the particular application. Selectivity is derived by virtue of the wide range of materials, thicknesses, densities, bead shapes and dimensions, unbeaded thicknesses and densities, that can be employed and in turn manufactured, with relatively simple tooling and mass produced at relatively low cost.

3. The highly conformable bead when compressed and compacted to form a seal between the clamped flange faces is brought to substantially the same density as the prepressed unbeaded portion, which in turn, then acts as a retainer for the bead since the unbeaded portion of the gasket, although higher density than the bead, is likewise compressible. One familiar with the art and science of gasketing will readily understand that no gasket faces are perfect for smoothness, flatness, parallelism, etc., for, if they were perfect with structures strong enough and adequately clamped, a gasket would not be required in the first place. Therefore, the gasket structure herein described is, when clamped, filling in, in a compacted form, the relatively uneven and nonuniform spaces between the clamping faces.

Where the bead 37 of relatively lesser density than the body portion 36 of the gasket structure may not be sufficient to provide a complete seal in those cases where the densification of the remaining portions of the gasket is not such as to completley close the voids which occur in the compactible gasket material, the gasket structure is provided with a coating material 16 comprising, in one form, a blend of curable neoprene and phenolic resin which is cured after application to provide a coating that is, for the most part, impenetrable by fluids with which the gaskets of this invention are intended to be used. This coating 16 is applied on one or both of the upper and lower surfaces of the gasket and on the interior aperture surfaces and the exterior edge surfaces, if desired, as disclosed in the aforementioned U.S. Pat. 3,361,401. Where the end use intended may be automotive, the coating is highly resistant to environmental fluids, which comprise hydrocarbons and other fluids that can be expected to cause deterioration of conventionally used gasket materials. Thus, the invention provides a gasket structure for automotive use wherein the gasket 35 is precompressed with an integrally formed bead 37 of relatively less density than the remainder of the gasket and having a curable coating 16 applied thereto which provides a superior seal and resists environmental conditions encountered in the field of use. The unbeaded portion of the gasket, because of being compressed, leaves little or no porosity in this area but since the beaded portion is subjected merely to light, if any compression, this area is only partially compressed and, consequently, may retain some porosity. The coating material 16, as applied and cured, will seal the voids that remain in the beaded area 37 after densification of the major body portion 36 of the gasket and provide an impermeable seal for the entire gasket.

4. The compressible, unbeaded portion of the gasket in this invention is always selectively prepressed to a density about the same and preferably higher than that which would be developed from the forces applied by the clamping fasteners or bolts. As stated above, the unbeaded portion is not only substantially flat by virtue of the prepressing, but the clamp load resistance is increased substantially together with the torque retention properties; or to state it another way — the stress relaxation of the material has been greatly reduced. It is appropriate to say that torque retention in gasketing is in reality divided into two basic categories: first, is a torque requirement sufficient to seal with the clamping conditions available; and, second, the torque required to hold the assembly together in the operating environment. Adequate torque retention, therefore, is a requirement substantially equal to sealing. In fact, in some cases, for example in power take-off accessories and in large earth-moving equipment, slight leakage (poor sealing) can be tolerated, but obviously inadequate torque retention that would result in loosening of the clamped joints to the point of equipment failure cannot be tolerated. This points up a basic fact that an installed gasket becomes part of the whole assembly. The prepressed unbeaded portion of the gasket in this invention is substantially more fluid resistant, and when clamped is more level and retains substantially greater torque than is possible to obtain from any of the materials above specified, for which this type gasket is adaptable.

5. It is known fact that it is always desirable to use as thin a gasket as possible for reasons of torque retention, sealability, flange distortion, fluid resistance and cost. The beaded gasket here described, when clamped between flanges can always be thinner than any unbeaded gasket selected to seal the same joint.

6. In the gasket of this invention, the use to which the particular gasket will be put will, of course, determine the materials used, the amount of precompression, the bead shape and size, etc., but, in general, it is intended for most applications that the body portion of the gasket will be compacted to a thickness substantially equal to the thickness that an unbeaded gasket of the same material would be compressed by the clamping action of the bolts so that all the work that is done prior to the flanges making firm contact with the body portion of the gasket is merely in the compression of the bead, and thereafter the bolts are drawn up tightly to provide the desired torque. For example, if an unbeaded gasket for a particular application has a .032 inch thickness, and when applied to the gasket assembly is brought down .007 inch to a thickness of .025 inch, then a corresponding beaded gasket, according to the present invention, would have a compacted body thickness of approximately .025 inch, so that when the bolts are drawn down tightly to clamp the gasket in place, the thickness might be reduced by additional .002 inch to .023 inch. This is purely illustrative, but it does illustrate the fact that even after compaction of the body portion there is ordinarily some compressibility left in such portion for setting the clamping bolts.

Finally, it will be seen that the gasket structure herein described fulfills the heretofore stated objectives, namely:

1. Test results definitely establish that the torque retention property of a gasket made according to this invention is substantially greater than gaskets made from the same material without the integrally formed bead, and that assembly distortion is also greatly reduced.

2. Because of the relatively high density of the body portion of the gasket, and the relatively low density of the beaded portion of the gasket, the clamping pressure requirements of the unbeaded area of the gasket are substantially reduced, which again minimizes distortion of the assembly.

3. Since the bead is performing a primary function of sealing the openings or passageways through the gasket from the external environment, it is important that the body portion of the gasket be tough enough to stand up under conditions of use and gasket application, and the compacting of the body portion of the gasket obviously substantially strengthens the gasket as a whole, so that it can more adequately serve as a strong retainer or base for the head.

4. With the body portion of the gasket being compacted and densified, an inevitable consequence is that the fluid resistance of the unbeaded portion of the gasket, i.e., the body portion of the gasket, is substantially enhanced.

5. At the same time that the sealing characteristics of the gasket as a whole are enhanced by the effect of the bead, the densification of the body portion of the gasket has the effect of increasing the sealability and recovery characteristics of the gasket as a whole.

6. The compacting of the body portion of the gasket substantially increases the tensile strength of the gasket and reduces loss of tensile strength through oil or fuel aging when the gasket is used in applications which provide for exposure to oil and fuel.

Furthermore, and of great importance, is the fact that these substantial improvements in gasket effectiveness and tailoring to suit the needs of a particular application are accomplished in a manner that is both economical and practical.

The embodiments of this invention in which an exclusive property or privilege is claimed are defined as follows:

1. A gasket structure suitable for sealing mating parts together which include a passageway therebetween and in which the mating parts may present non-planar surfaces for sealing, said gasket structure being made of a homogeneous, fiber-reenforced compactible material and characterized by minute voids therein, said gasket structure including one or more bolt holes therethrough and an opening matching the passageway through the members which are to be clamped together, said gasket structure having a body portion and an integral bead formed on at least one side of the gasket, the body portion throughout substantially the entire extent of the gasket structure, but exclusive of the bead, being of substantially uniform relatively high density, and the bead being of relatively low density and extending substantially around said passageway, said bead being spaced from said opening whereby the densified area includes substantially the entire area around said opening and around said bolt holes.

2. A gasket structure as set forth in claim 1 in which the gasket structure has a metal facing on both sides.

3. A gasket structure as set forth in claim 1 in which the gasket structure includes asbestos millboard having an inorganic binder.

4. A gasket structure as set forth in claim 3 in which thin metal facings are adhered to the millboard and the low density beads are formed in both the millboard and the metal facings.

5. A gasket structure as set forth in claim 1 in which the beads are in double rows and non-continuous and in which metal sheets are applied to both sides of the compactible material, with slots in the metal sheets outlining said beads.

6. A gasket structure as set forth in claim 1 in which the gasket structure is a laminate with the bead comprising a relatively soft compressible material interposed between the opposing sheets of the laminate.

7. A gasket structure as set forth in claim 1 wherein a coating is applied on the top and bottom surfaces of the gasket structure comprising a unitary and continuous layer of a thermosetting mixture of synthetic elastomer with synthetic resin, said coating providing the requisite sealing characteristics for closing voids remaining in relatively uncompressed areas and for protecting the gasket material from the deleterious effect of the environment in which the gasket is used and for effecting a fluid seal along the top and bottom surfaces when the gasket structure is clamped between said mating parts.

8. A gasket structure as set forth in claim 7 wherein a release coating covers said elastomer-resin coating on the top and bottom surfaces.

9. A gasket structure suitable for sealing mating parts together which include a passageway therebetween and in which the mating parts may present non-planar surfaces for sealing, said gasket structure being made of a homogeneous, fiber-reenforced compactible material and characterized by minute voids therein, said gasket structure including one or more bolt holes therethrough and an opening matching the passageway through the members which are to be clamped together, said gasket structure having at least 70 percent of its planar area compacted prior to application of the gasket structure, to a density at least 10 percent greater than the density of the gasket material prior to compression and having an integral bead surrounding at least a part of said opening, with the density of said bead being substantially equal to or less than the density of the gasket material prior to compression, said bead being spaced from said opening whereby said compacted or densified area includes substantially the entire area around said opening and around said bolt holes.

10. A gasket structure as set forth in claim 9 wherein a coating is applied on the top and bottom surfaces of the gasket structure and the interior walls of said openings comprising a unitary and continuous layer of a thermosetting mixture of synthetic elastomer with synthetic resin, said coating providing the requisite sealing characteristics for closing the voids remaining in relatively uncompressed areas and for protecting the gasket material from the deleterious effects of the environment in which the gasket is used and for effecting a fluid seal along the top and bottom surfaces when the gasket structure is clamped between said mating parts.

11. A gasket structure suitable for sealing mating parts together which include a passageway therebetween and in which the mating parts may present non-planar surfaces for sealing, said gasket structure being made of a homogeneous, compactible material and characterized by minute voids therein, said gasket structure including one or more bolt holes therethrough and an opening matching the passageway through the members which are to be clamped together, said gasket structure having a body portion and a bead portion substantially surrounding said opening, but spaced therefrom, the bead portion being highly compressible and of relatively low density and the body portion constituting the remainder of the gasket structure and being of substantially uniform relatively high density and uniform thickness, said high density body portion including substantially the entire area around said opening.

12. A gasket structure as set forth in claim 11 wherein the compactible material is a fiber reenforced elastomer.

13. A gasket structure as set forth in claim 11 in which the bead is integral with the body portion of the gasket structure.

14. A gasket structure as set forth in claim 11 wherein a coating is applied on the top and bottom surfaces of the gasket structure and the interior walls of said openings comprising a unitary and continuous layer of a thermosetting mixture of synthetic elastomer with synthetic resin, said coating providing the requisite sealing characteristics for closing the voids remaining in relatively uncompressed areas and for protecting the gasket material from the deleterious effect of the environment in which the gasket is used and for effecting a fluid seal along the top and bottom surfaces when the gasket structure is clamped between said mating parts.

15. The method of effectively sealing mating surfaces of adjacent parts through which there is a passageway therebetween and in which the mating surfaces are subject to deformation under excessive clamping loads applied to bolts connecting the mating members, said method consisting of applying a gasket member between the mating members with an opening in the gasket corresponding to the passageway between the adjacent parts, said gasket being composed of compactible packing material which has been precompressed to a relatively high density such that when clamping loads are applied for clamping the mating members together with the gasket interposed therebetween the clamp load required for obtaining necessary torque retention of the bolt during use of the parts causes substantially no distortion of said mating members, said gasket also including an integral bead on one or both sides of the gasket and substantially surrounding the passageway, with the bead having substantially less density than the density of the precompressed body portion of the gasket, said gasket having substantially its entire area, except for the integral bead, of said precompresseed high density material.

16. A gasket structure suitable for sealing mating parts together which include a passageway therebetween and in which the mating parts may present non-planar surfaces for sealing, said gasket structure being made of a homogeneous, compactible material and characterized by minute voids therein, said gasket structure including one or more bolt holes therethrough and an opening matching the passageway through the members which are to be clamped together, said gasket structure having a body portion and a bead portion substantially surrounding said opening, but spaced therefrom, the bead portion being highly compressible and of relatively low density and the body portion constituting the remainder of the gasket structure and being of substantially uniform relatively high density and uniform thickness, said high density body portion including substantially the entire area around said opening, and a coating on one or both of the top and bottom surfaces of the gasket structure, said coating comprising a unitary and continuous layer of at least partially cured elastomer-resin formed from a thermosetting mixture of synthetic elastomer and synthetic resin with the mixture curing at a temperature within the range of 325° F and 400° F and having a thickness in the range of .0001 inch and .005 inch.

17. A gasket structure as set forth in claim 16 wherein a release coating covers said elastomer-resin coating on said top and bottom surfaces.

18. A gasket structure as set forth in claim 16 wherein said coating is applied on the interior aperture walls of the gasket structure.

19. A gasket structure as set forth in claim 16 wherein a coating is applied on the top and bottom surfaces of the gasket structure comprising a unitary and continuous layer of at least partially cured elastomer-resin formed from a mixture of synthetic elastomer and synthetic resin.

* * * * *

UNITED STATES PATENT OFFICE
CERTIFICATE OF CORRECTION

Patent No. 3,837,657   Dated September 24, 1974

Inventor(s) Robert G. Farnam and Michael T. Passarella

It is certified that error appears in the above-identified patent and that said Letters Patent are hereby corrected as shown below:

Column 1, line 56, "road" should read --load--; Column 6, line 47, "63100 1" should read --63100--; Column 10, line 46, "that" should read --than--; Column 11, line 59, "tip" should read --top--; Column 12, line 45, "(Mtchell)" should be --(Mitchell)--.

Signed and sealed this 10th day of December 1974.

(SEAL)
Attest:

McCOY M. GIBSON JR.
Attesting Officer

C. MARSHALL DANN
Commissioner of Patents